Patented May 7, 1935

2,000,202

UNITED STATES PATENT OFFICE 2,000,202

PROCESS FOR THE RECOVERY OF SUGAR AND SALTS FROM SUGAR CANE MOLASSES

Eugenio Antonio Vazquez, Habana, Cuba

No Drawing. Application October 25, 1932, Serial No. 639,486. In Cuba July 26, 1932

13 Claims. (Cl. 127—47)

This invention relates to the recovery of sugars and salts contained in residual molasses left in the manufacture of cane sugar or beet sugar, and provides a new process of obtaining from it a syrup of high purity in all sugars, a residue of crude salts and a residue of substantially exhausted molasses.

Sugar cane molasses is a concentrated residual by-product of the sugar industry, obtained from sugar cane juice in the normal process of extracting centrifugal sugar from it. It contains a substantial amount of unextracted sugar in combination with organic and inorganic salts, coloring matter and other compounds extracted from the sugar cane, and more or less modified during the process of sugar production.

Likewise, beet sugar molasses contains a substantial amount of unextracted sugar, and other valuable compounds which may be recovered by means of my process.

While the process as herein described refers to exhausted molasses obtained in the manufacture of cane sugar, it is equally applicable to partially or totally dried molasses, and to other molasses richer in sucrose than exhausted molasses, as for instance first, second or other molasses normally produced in the intermediate stages of sugar manufacture.

The process consists essentially in treating the molasses with chemical solvents for the extraction of its waxes, fats, organic acids, coloring matter, and other organic non-sugar constituents; in washing the mass so formed to remove the last traces of the solvents, and to remove coloring matter; and in adding a sugar solvent to the washed mass which contains the sugars and salts to separate the sugar as a syrup, by decantation or filtration, from the insoluble residue formed of crude organic and inorganic salts.

Crystallized sugar can be obtained from this syrup, or it can be used as it is, while the crude salts can be used as a fertilizer, or can be used for extracting valuable salts. From the wash liquor, obtained in washing the mass, and the solution first removed containing waxes, fats, organic acids, coloring matter, etc., a re-exhausted molasses can be obtained, which is useful in the manufacture of alcohol, or from which valuable organic substances and compounds may be extracted.

To carry out the process, a mixture of alcohol (preferably ethyl alcohol of 95%), an organic compound non-solvent of sugars but miscible in the alcohol, and sulphuric acid is added to the molasses. The object of adding this mixture to the molasses is to displace the organic acids from their combinations and to dissolve them, as well as the waxes, fats, coloring matter, and other organic and inorganic substances and compounds, and leave the sugars which it contains substantially undissolved. The sugar amounts to from 40 to 60% of the weight of the original molasses, and the extraction of them is the main object of this process.

Ethyl acetate is preferred as the organic solvent, non-solvent of sugar, but other organic compounds non-solvents of sugars may be used in the mixture in combination with the alcohol and sulphuric acid; as for instance, chlorinated hydrocarbons, aromatic hydro-carbons, aliphatic hydro-carbons, ethers, esters and aliphatic acids, and acid derivatives. Among these preference is given to benzene, gasoline, acetic acid and carbon tetrachloride.

The mixture of molasses with the alcohol, ethyl acetate and sulphuric acid is agitated by mechanical means until a uniform mass is obtained, in which the sugars have been substantially separated from the impurities contained in the molasses. These impurities consist of organic acids, waxes, fats, coloring matter and other organic and inorganic substances and compounds.

They pass into solution, and may be removed from the mass by decantation. For example, the material may be washed with alcohol of such strength as to be practically a sugar non-solvent, as for instance alcohol of 95%. In this way the organic acids, waxes, fats, coloring matter and other organic and inorganic compounds are separated from the mass. The washing is continued until the acidity is materially reduced, and the color lightens to the shade corresponding to its purity in sugars. The water contained in the molasses is likewise reduced by the absorbing power of the alcohol used in the washing, which if carried far enough would practically dehydrate the mass.

The washing can be done in a continuous counter-current system, in which case the alcohol enters at one end of the system and leaves by the other end, traveling in opposite directions to the mass; which leaves the system completely washed and free from impurities at the end where the alcohol enters, while the latter leaves the system as a dark liquor charged with these impurities.

The washing can be done also by batches, or else continuously by stages. The results are the same, but the washing done in a continuous system is more rapid and requiries less alcohol.

In place of mixing ethyl acetate with alcohol and sulphuric acid for the first treatment of the molasses, alcohol mixed with sulphuric acid alone could be used, and the ethyl acetate left to be used solely for the washing of the mass, mixed with the alcohol destined for such washing. The result would be the same. In that case the waxes and fats will not be extracted in the first treatment, and the quantity of mixture required for this treatment will be materially greater. This quantity must be sufficient to maintain in the alcohol of the mixture the minimum strength required. The strength of the alcohol is diminished by the water contained in the molasses, which increases its solubility of sugars and salts. This minimum strength of the alcohol is proportional to the yield of crystallized sugar. The smaller the strength of the alcohol the greater will be the quantity of sugars dissolved and separated in the first washing, which go to enrich the exhausted molasses.

To obtain the same yield of crystallized sugar with alcohol and sulphuric acid, it is necessary to use partially dried molasses, or else to use absolute alcohol.

To obtain the highest economy in operation, the highest yield in sucrose, and in the extraction of fats, waxes and similar substances and compounds in the initial treatment, it is necessary to add to the alcohol and sulphuric acid one or more solvents, which besides dissolving such bodies, are miscible in alcohol and are non-solvent of sugars and salts.

The wash liquor which holds in solution the impurities of the molasses, in the form of organic acids, fats, waxes and coloring matter, has a very dark color, while the wash mass becomes lighter as the operation advances.

When the washing is completed, the mass is neutralized with lime or with sodium carbonate, or with both, or with some other alkaline base or salt. Under these conditions the color of the mass, which contains nearly all the sugars of the molasses, is fixed.

The wash liquor is concentrated by evaporation until a molasses is obtained which is substantially exhausted, and which remains as a final residue. This final residue molasses can be used for the manufacture of alcohol or for the extraction of useful organic substances, while the alcohol and the organic solvent non-solvent of sugars used in the treatment of and washing of the mass are recovered by distillation.

To extract the sugars from the neutralized mass, the latter is mixed with alcohol of about 80% to 90%, which is added gradually while the mass is kept under continued agitation until all the sugars are dissolved in the alcohol. This operation can be aided by the application of exterior heat, but it is not necessary. The organic and inorganic salts contained in the mass and which are not soluble in alcohol, become practically isolated and form a residue which can be separated by filteration, decantation or other methods from the alcoholic solution of the sugars.

The alcoholic solution is then concentrated by evaporation to recover the alcohol used for the solution of the sugars, and to crystallize the concentrated solution, so as to obtain crystallizable sugar.

The recovered solvents can be used over and over again in new cycles of operations.

In a specific example of the process a plant producing 1390 gallons (17,375 pounds) of molasses per hour will be assumed. The molasses at a temperature of from 70° to 90° F. is treated with an equal weight of alcohol mixed with about 5% sulphuric acid and 12½% ethyl acetate, based on the weight of the original molasses. The amount of alcohol used in the first treatment depends in part on the amount of water contained in the molasses. To keep this within reasonable limits, the molasses may first be treated to reduce the water content to a selected limit. While the molasses is still hot, alcohol may be added to it to maintain its fluidity and the molasses then cooled to the operating temperature of 70° to 90° F.

When the solvents are added, the molasses is agitated until a uniform mass is obtained. This gradually separates into a dark liquid portion containing the dissolved organic acids and other compounds forming the impurities of the molasses and leaves the undissolved sugars and salts as a pasty and heavier mass. The liquid portion is separated by decanting or otherwise and eventually concentrated by evaporation, as set forth above. The mass is washed with alcohol of about 95% strength until practically all traces of the solvent mixture are removed. This washing also reduces the acidity of the mass and changes the color to the shade corresponding to the color required for edible sugar syrup. The alcohol used in washing also reduces the amount of water left in the mass which becomes more pasty as dehydration progresses. The wash liquor is added to the decanted solution which, on concentration, produces a re-exhausted molasses which may be used in the manufacture of alcohol or from which the useful organic substances may be extracted.

The other portion or the mass containing the sugars and salts is neutralized preferably by adding alcoholic milk of lime and agitating the mass. The quantity of lime added may vary within wide limits but I generally employ about 2½% based on the original weight of the molasses. The last traces of ethyl acetate may be removed from the mass by evaporation. The mass obtained from the above treatment will weigh about 13,900 pounds. An amount of alcohol of about 80% strength, equal to 1.6 times the weight of the original molasses, is then added to the mass at a temperature of 150° F. and the mass continuously agitated. The larger portion of the sugars in the original molasses pass into solution in the alcohol at the temperature and strength stated while the salts remain undissolved. The liquid portion is then removed by filtration or otherwise leaving the salts as a residue. This liquid may be concentrated to produce an edible syrup of high purity or further concentration will yield crystallized sugars. The salt residue may be used directly as a fertilizer or valuable salts may be extracted therefrom as desired.

It is understood that the nature of the solvents used can be varied, especially the organic solvent non-solvent of sugars, employed to separate the impurities retained by the sugars and which prevent their crystallization, without altering the essential features of the process, and which constitute the essence of this invention as defined in the following claims.

I claim:
1. A process for extracting organic acids from molasses, which comprises treating the molasses with sulphuric acid, alcohol and a non-solvent of sugars but solvent of such organic acids as have been liberated by the sulphuric acid; selected from the group consisting of, chlorinated hydrocarbons, aromatic hydrocarbons, aliphatic hydrocarbons, ethers, esters and aliphatic acids and separating the solution containing these organic acids from the mass containing the sugars and inorganic salts.

2. A process for extracting organic acids from molasses, which comprises treating the molasses with a mixture of alcohol, sulphuric acid, and ethyl acetate, to displace the organic acids in the molasses by the sulphuric acid and to dissolve them together with the fats, waxes and coloring matter; separating this solution from the residual mass by decantation; washing this mass with strong alcohol until the acids are practically eliminated, and distilling the combined solution of organic acids and washings to recover the organic acids and the ethyl acetate.

3. A process for extracting organic acids from molasses, which comprises treating the molasses as a single batch, with a mixture of alcohol, sulphuric acid, and benzene, to displace the organic acids in the molasses by the sulphuric acid and to dissolve them together with the fats, waxes and coloring matter; separating this solution from the residual mass by decantation; washing the residual mass with strong alcohol until the acids are practically eliminated, and distilling the combined solution of organic acids and washings to recover the organic acids and the benzene.

4. Process according to claim 3 wherein successive batches of molasses are treated and the solution obtained from each batch is employed as the solvent mixture for the next batch.

5. Process according to claim 3 wherein the molasses is introduced at one end of a continuous system and the solvent at the other end and said solvent and said molasses travel through said system in counter-current to each other.

6. A process for fractionizing molasses into three parts: 1st, a solution rich in organic acids; 2nd, a solution rich in sugars and, 3rd, a residual mass containing substantially all the inorganic salts resulting from the process, which comprises the following combination of steps, mixing the molasses with sulphuric acid, alcohol and a nonsolvent of sugars, but solvent of the organic acids displaced by the sulphuric acid in the molasses selected from the group consisting of, chlorinated hydrocarbons, aromatic hydrocarbons, aliphatic hydrocarbons, ethers, esters and aliphatic acids; separating the solution containing such organic acids from the residual mass; washing the residual mass with strong alcohol or other solvent of organic acids non-solvent of sugars to exhaust the residual mass of acids; adding alcoholic milk of lime to neutralize the mass of sugars and salts from the last traces of acids; dissolving the sugars in said mass with hot alcohol; and, separating the sugar solution from the mass of undissolved salts by decantation or filtration.

7. A process to produce an edible syrup from molasses of high purity in all sugars, which comprises treating the molasses with a mixture of alcohol, ethyl acetate and sulphuric acid, to displace the organic acids in the molasses and to dissolve these organic acids as such, and in combinations as esters, and to dissolve the fats, waxes and coloring matter; separating this solution by decantation, washing the resulting mass with strong alcohol until the acids are practically eliminated; dissolving the sugars in the final mass with hot alcohol, separating the solution from the insoluble mass by decantation or filtration; separating the alcohol from the sugar solution by distillation, and adding sufficient water during distillation to obtain a syrup of the required consistency and free from alcohol.

8. A process to produce an edible syrup from molasses, of high purity in all sugars which comprises treating the molasses with a mixture of alcohol, ethyl acetate and sulphuric acid to displace the organic acids in the molasses and to dissolve these organic acids and to dissolve the fats, waxes and coloring matter; separating this solution by decantation, washing the resulting mass with strong alcohol until the acids are practically eliminated; dissolving the sugars in the final mass with hot alcohol, separating the solution from the insoluble mass by decantation and filtration, separating the alcohol from the sugar solution by distillation, and adding sufficient water during distillation to obtain a syrup of the required consistency and free from alcohol.

9. A process to produce an edible syrup from molasses, of high purity in all sugars, which comprises treating the molasses with a mixture of alcohol, ethyl acetate and sulphuric acid to displace the organic acids in the molasses in combination as esters and to dissolve the fats, waxes and coloring matter; separating this solution by decantation, washing the resulting mass with strong alcohol until the acids are practically eliminated; dissolving the sugars in the final mass with hot alcohol; separating the solution from the insoluble mass by decantation and filtration; separating the alcohol from the sugar solution by distillation, and adding sufficient water during distillation to obtain a syrup of the required consistency and free from alcohol.

10. A process to produce an edible syrup from molasses of high purity in all sugars, which comprises treating the molasses with a mixture of alcohol, sulphuric acid, ethyl acetate and about 1 to 2 percent of acetic acid to displace the organic acids in the molasses with the sulphuric acid, and to dissolve these organic acids as such and in combination as esters, and to dissolve the fats, waxes and coloring matter; separating this solution from the residual mass by decantation, washing the residual mass with strong alcohol until the acids are practically eliminated, dissolving the sugars in this final mass with hot alcohol; separating the alcohol from this solution by distillation, adding sufficient water during distillation to obtain a syrup of the required consistency; and distilling the combined solution of organic acids and washings to recover these acids and the ethyl acetate used, and that formed by the acetic acid and alcohol during distillation.

11. A process to produce an edible syrup and crystallized sugars from molasses and which comprises treating the molasses with a mixture of alcohol, sulphuric acid, and ethyl acetate to displace the organic acids in the molasses and to dissolve these organic acids as such and in combinations as esters, and to dissolve the fats, waxes and coloring matter; separating the solution by decantation, washing the resulting mass with strong alcohol until the acids are practically eliminated; dissolving the sugars in this final mass with hot alcohol, separating this sugar solution from the insoluble mass by decantation or filtration; and treating this sugar solution to obtain crystallized sugar and an edible syrup.

12. A process to produce a product of salts from molasses, which comprises treating the molasses with a mixture of alcohol, sulphuric acid and an organic solvent non-solvent of sugars selected from the group consisting of chlorinated hydrocarbons, aromatic hydrocarbons, aliphatic hydrocarbons, ethers, esters and aliphatic acids whereby the organic acids of the molasses are displaced from their combinations by the sulphuric acid, and are dissolved together with the fats, waxes and other organic non-sugars solvent in this solvent mixture; separating this acid liquor from the mass of sugars and salts not soluble in this liquid mixture; dissolving the sugars contained in this mass with alcohol of low strength to separate them from the salts insoluble in such alcohol, and recovering the salts by filtration.

13. A process to produce simultaneously crystallized sugar, an edible syrup, a liquor rich in organic acids and esters, and a product containing salts from molasses which comprises treating the molasses with a mixture of alcohol, sulphuric acid and an organic solvent miscible in alcohol and non-solvent of sugars but solvent of the organic acid fats, waxes, coloring matter and of other organic non-sugars in the molasses selected from the group consisting of chlorinated hydrocarbons, aromatic hydrocarbons, aliphatic hydrocarbons, ethers, esters and aliphatic acids, whereby the organic acids are displaced from their combinations by the sulphuric acid, and are dissolved together with the fats, waxes and other organic non-sugars soluble in this solvent mixture; separating this acid liquor from the mass of sugars and salts not soluble in the liquid mixture; dissolving the sugars contained in this mass with alcohol of low strength to separate them from the salts which are insoluble in such alcohol; treating this sugar solution to obtain crystallized sugars and an edible syrup; and distilling the acid liquor to recover the organic solvent used in the treatment.

EUGENIO ANTONIO VAZQUEZ.